US011828704B2

(12) United States Patent
Hagman

(10) Patent No.: US 11,828,704 B2
(45) Date of Patent: Nov. 28, 2023

(54) SPATIAL IMAGE PROCESSING FOR ENHANCED GAS IMAGING SYSTEMS AND METHODS

(71) Applicant: FLIR Systems AB, Täby (SE)

(72) Inventor: Henning Hagman, Täby (SE)

(73) Assignee: FLIR Systems AB, Täby (SE)

( * ) Notice: Subject to any disclaimer, the term of this patent is extended or adjusted under 35 U.S.C. 154(b) by 840 days.

(21) Appl. No.: 16/899,389

(22) Filed: Jun. 11, 2020

(65) Prior Publication Data

US 2020/0393367 A1    Dec. 17, 2020

Related U.S. Application Data

(60) Provisional application No. 62/861,972, filed on Jun. 14, 2019.

(51) Int. Cl.
*G01N 21/3504* (2014.01)
*G06T 7/44* (2017.01)
(Continued)

(52) U.S. Cl.
CPC ........ *G01N 21/3504* (2013.01); *G01J 3/2823* (2013.01); *G01M 3/002* (2013.01); *G01M 3/04* (2013.01); *G01M 3/38* (2013.01); *G01N 21/3518* (2013.01); *G06T 7/44* (2017.01); *G06V 10/143* (2022.01); *H04N 5/33* (2013.01); *G01J 2003/2826* (2013.01); *G01N 21/716* (2013.01); *G06T 2207/10048* (2013.01)

(58) Field of Classification Search
CPC ............ G06T 7/44; G06T 2207/10048; G06V 10/143; G01N 21/3504; G01N 21/3518; G01N 21/716; G01N 2021/3531; G01J 3/2823; G01J 2003/2826; G01M 3/002; G01M 3/04; G01M 3/38; H04N 5/33
See application file for complete search history.

(56) References Cited

U.S. PATENT DOCUMENTS 6,803,577 B2 * 10/2004 Edner ................ G01N 21/3518
250/339.09
2019/0212261 A1 * 7/2019 Lannestedt ........ G01N 21/3504

OTHER PUBLICATIONS

Jadin et al. "Gas Leakage Detection Using Thermal Imaging Technique." IKSim-AMSS 16th International Conference on Computer Modelling and Simulation, Mar. 26, 2014, pp. 302-306 (Year: 2014).*

(Continued)

*Primary Examiner* — Jon Chang
(74) *Attorney, Agent, or Firm* — Haynes and Boone, LLP

(57) ABSTRACT

Various techniques are provided for increasing contrast of gas features in a scene. In one example, a method includes receiving a captured infrared image comprising a gas feature and a scene feature. The captured infrared image comprises a first range of pixel values associated with a first temperature range of the gas feature and the scene feature. The method also includes applying a spatial filter to the captured infrared image to provide a spatially filtered infrared image retaining the gas feature and removing the scene feature. The spatially filtered infrared image comprises a second range of pixel values associated with a second temperature range of the gas feature without the additional scene feature to exhibit increased gas contrast over the captured infrared image. Additional methods and systems are also provided.

20 Claims, 7 Drawing Sheets

(51) Int. Cl.
*H04N 5/33* (2023.01)
*G01J 3/28* (2006.01)
*G01M 3/00* (2006.01)
*G01M 3/04* (2006.01)
*G01M 3/38* (2006.01)
*G01N 21/3518* (2014.01)
*G06V 10/143* (2022.01)
*G01N 21/71* (2006.01)

(56) References Cited

OTHER PUBLICATIONS

Dai et al. "Leakage Region Detection of Gas Insulated Equipment by Applying Infrared Image Processing Technique." 9th International Conference on Measuring Technology and Mechatronics Automation, Jan. 14, 2017, pp. 94-98 (Year: 2017).*
Kim. "A Knowledge Based Infrared Camera System for Invisible Gas Detection Utilizing Image Processing Techniques." Journal of Ambient Intelligence and Humanized Computing, https://doi.org/10.1007/s12652-019-01342-x, Jun. 12, 2019, 11 pages (Year: 2019).*

* cited by examiner

SPATIAL IMAGE PROCESSING FOR ENHANCED GAS IMAGING SYSTEMS AND METHODS

CROSS REFERENCE TO RELATED APPLICATIONS

This application claims the benefit of and priority to U.S. Provisional Patent Application No. 62/861,972 filed Jun. 14, 2019 and entitled "SPATIAL IMAGE PROCESSING FOR ENHANCED GAS IMAGING SYSTEMS AND METHODS," which is incorporated herein by reference in its entirety.

TECHNICAL FIELD

The present invention relates generally to gas detection techniques and, more particularly, to the processing of gas images.

BACKGROUND

In the field of gas detection, infrared imaging systems such as gas detection cameras are used to capture infrared images (e.g., image frames) of a scene where a gas of interest (e.g., a gas plume) is present. In a scene containing gas, additional scene features such as various objects or background information may also be present. Such additional scene features create challenges for the detection of gas.

For example, scenes including gas and additional scene features may exhibit a high dynamic range with pixel values of captured infrared images mapped to a large range of temperatures (e.g., the gas and non-gas features may exhibit significantly different infrared radiation intensities and the images may therefore exhibit a large span). However, a gas present in the scene may correspond to only a small range of the pixel values. As a result, the gas will exhibit low contrast in the images and may not be easily distinguishable from other scene content.

Existing processing techniques for increasing gas contrast can suffer from various drawbacks. For example, histogram equalization processing may affect all spatial frequencies in images and have limited usefulness for images with large temperature differences, or may be computationally demanding when applied locally within images. Temporal difference processing may be used to remove static content within images, but may provide images that change too rapidly, are difficult to understand in context, and still show non-gas features when a camera is in motion. Moreover, although manual settings of level and span can sometimes be used, they may be difficult and time consuming for users to manipulate

SUMMARY

Improved techniques for increasing gas contrast in infrared images are provided. In one embodiment, a method includes receiving a captured infrared image comprising a gas feature and a scene feature, wherein the captured infrared image comprises a first range of pixel values associated with a first temperature range of the gas feature and the scene feature; applying a spatial filter to the captured infrared image to provide a spatially filtered infrared image retaining the gas feature and removing the scene feature; and wherein the spatially filtered infrared image comprises a second range of pixel values associated with a second temperature range of the gas feature without the additional scene feature to exhibit increased gas contrast over the captured infrared image.

In another embodiment, a system includes an infrared imager configured to capture infrared images; and a logic device configured to: receive a captured infrared image comprising a gas feature and a scene feature, wherein the captured infrared image comprises a first range of pixel values associated with a first temperature range of the gas feature and the scene feature, apply a spatial filter to the captured infrared image to provide a spatially filtered infrared image retaining the gas feature and removing the scene feature, and wherein the spatially filtered infrared image comprises a second range of pixel values associated with a second temperature range of the gas feature without the additional scene feature to exhibit increased gas contrast over the captured infrared image.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Various techniques are provided to provide infrared images with enhanced gas contrast. For example, spatial frequencies associated with flowing gas may be enhanced and a flat infrared image exhibiting a contour of a gas may be generated. In particular, by limiting the infrared image to spatial frequencies associated with the gas, other features of an imaged scene may be reduced, thus reducing large temperature differences in the imaged scene. As a result, pixel values associated with the gas may be mapped to a larger range (e.g., the gas may be associated with a greater proportion of the overall span of pixel values of the image), thus increasing gas contrast.

Figure 1:
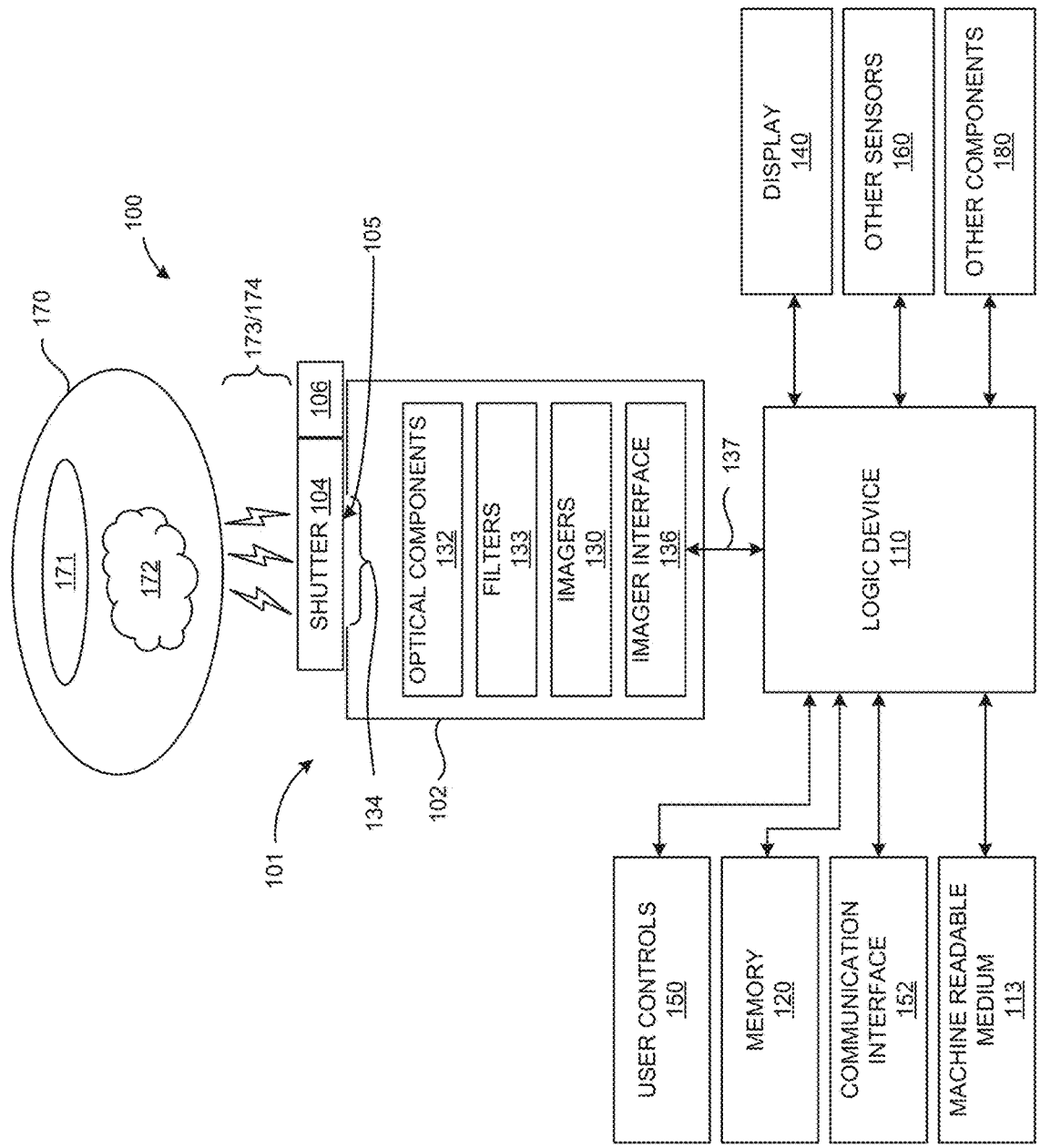
FIG. 1 illustrates a block diagram of an imaging system in accordance with an embodiment of the disclosure.

Turning now to the drawings, FIG. 1 illustrates a block diagram of an imaging system 100 in accordance with an embodiment of the disclosure. Imaging system 100 may include a camera 101, a logic device 110, a machine-readable medium 113, a memory 120, a display 140, user controls 150, a communication interface 152, other sensors 160, and other components 180. In various embodiments, a plurality of any of the components of FIG. 1 may be provided as appropriate.

Camera 101 may be used to capture and process images (e.g., image frames) of a scene 170 (e.g., a field of view). As shown, scene 170 may include a gas 172 (e.g., a gas plume) and other scene features 171, all of which may contribute to infrared radiation 173 and visible light 174 passed from scene 170 to camera 101. In various embodiments, camera 101 may be implemented as a visible image camera, an infrared camera (e.g., thermal camera), and/or other types of cameras as appropriate. As shown, camera 101 may include a housing 102, a shutter 104, an actuator 106, one or more imagers 130, optical components 132, filters 133, and an imager interface 136. In the embodiments discussed herein, camera 101 may be implemented to capture infrared images using at least one or more of imagers 130 and visible light images using at least one or more other imagers 130. In some embodiments, separate infrared and visible light cameras 101 may be provided. In addition, the various features of camera 101 may be adjusted as appropriate to capture both infrared images and visible light images.

Optical components 132 (e.g., one or more lenses) receive infrared radiation 173 and visible light 174 from scene 170 through an aperture 134 and pass it to imagers 130. Filters 133 (e.g., one or more long pass, short pass, and/or band pass filters) operate to restrict infrared radiation 173 and visible light 174 to limited wavelength ranges for imaging. For example, in some embodiments, different optical components 132 and/or filters 133 may be associated with different wavelengths of infrared radiation 173 and visible light 174 as appropriate.

Each imager 130 may include an array of sensors (e.g., any type of infrared, visible light, or other types of detectors) for capturing images of scene 170. In some embodiments, imager 130 may also include one or more analog-to-digital converters for converting analog signals captured by the sensors into digital data (e.g., pixel values) to provide the captured images. Imager interface 136 provides the captured images to logic device 110 (e.g., over a connection 137) which may be used to process the images, store the original and/or processed images in memory 120, and/or retrieve stored images from memory 120.

Camera 101 also includes a shutter 104 that may be selectively positioned (e.g., through the operation of an actuator 106 under the control of logic device 110) in front of optical components 132 and/or imagers 130 to block infrared radiation 173 from being received by imagers 130. For example, actuator 106 may position to shutter 104 to block aperture 134 such that an imager 130 may capture infrared images of shutter 104 for calibration purposes. In this regard, in some embodiments, shutter 104 may provide a temperature controlled black body surface 105 facing the imager 130 that is captured in one or more images by the imager 130 to determine correction values for rows, columns, and/or individual pixels associated with the infrared sensors of the imager 130. Actuator 106 may also position shutter 104 to not block aperture 134 and thus permit the imager 130 to capture images of infrared radiation 173 received from scene 170 when calibration is not taking place.

Logic device 110 may include, for example, a microprocessor, a single-core processor, a multi-core processor, a microcontroller, a programmable logic device configured to perform processing operations, a digital signal processing (DSP) device, one or more memories for storing executable instructions (e.g., software, firmware, or other instructions), and/or any other appropriate combinations of devices and/or memory to perform any of the various operations described herein. Logic device 110 is configured to interface and communicate with the various components illustrated in FIG. 1 to perform method and processing steps as described herein. In various embodiments, processing instructions may be integrated in software and/or hardware as part of logic device 110, or code (e.g., software and/or configuration data) which may be stored in memory 120 and/or a machine readable medium 113. In various embodiments, the instructions stored in memory 120 and/or machine-readable medium 113 permit logic device 110 to perform the various operations discussed herein and/or control various components of system 100 for such operations.

Memory 120 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, fixed memory, removable memory, and/or other types of memory.

Machine readable medium 113 (e.g., a memory, a hard drive, a compact disk, a digital video disk, or a flash memory) may be a non-transitory machine-readable medium storing instructions for execution by logic device 110. In various embodiments, machine readable medium 113 may be included as part of imaging system 100 and/or separate from imaging system 100, with stored instructions provided to imaging system 100 by coupling the machine readable medium 113 to imaging system 100 and/or by imaging system 100 downloading (e.g., via a wired or wireless link) the instructions from the machine readable medium (e.g., containing the non-transitory information).

Logic device 110 may be configured to process captured images and provide them to display 140 for viewing by a user. Display 140 may include a display device such as a liquid crystal display (LCD), an organic light-emitting diode (OLED) display, and/or other types of displays as appropriate to display images and/or information to a user of system 100. Logic device 110 may be configured to display images and information on display 140. For example, logic device 110 may be configured to retrieve images and information from memory 120 and provide images and information to display 140 for presentation to a user of system 100. Display 140 may include display electronics, which may be utilized by logic device 110 to display such images and information.

User controls 150 may include any desired type of user input and/or interface device having one or more user actuated components, such as one or more buttons, slide bars, knobs, keyboards, joysticks, and/or other types of controls that are configured to generate one or more user actuated input control signals. In some embodiments, user controls 150 may be integrated with display 140 as a touchscreen to operate as both user controls 150 and display 140. Logic device 110 may be configured to sense control input signals from user controls 150 and respond to sensed control input signals received therefrom. In some embodiments, portions of display 140 and/or user controls 150 may be implemented by appropriate portions of a tablet, a laptop computer, a desktop computer, and/or other types of devices.

In various embodiments, user controls 150 may be configured to include one or more other user-activated mechanisms to provide various other control operations of imaging system 100, such as auto-focus, menu enable and selection, field of view (FoV), brightness, contrast, gain, offset, spatial, temporal, and/or various other features and/or parameters.

Imaging system 100 may include various types of other sensors 160 including, for example, motion sensors (e.g., accelerometers, vibration sensors, gyroscopes and/or others), microphones, navigation sensors (e.g., global positioning system (GPS) sensors), and/or other sensors as appropriate.

Logic device 110 may be configured to receive and pass images from camera component 101, additional data from sensors 160, and control signal information from user controls 150 to one or more external devices through communication interface 152 (e.g., through wired and/or wireless communications). In this regard, communication interface 152 may be implemented to provide wired communication over a cable and/or wireless communication over an antenna. For example, communication interface 152 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components configured for communication with a network. As such, communication interface 152 may include an antenna coupled thereto for wireless communication purposes. In other embodiments, the communication interface 152 may be configured to interface with a DSL (e.g., Digital Subscriber Line) modem, a PSTN (Public Switched Telephone Network) modem, an Ethernet device, and/or various other types of wired and/or wireless network communication devices configured for communication with a network.

In some embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) configured to communicate with other communication networks, such as the Internet. As such, in various embodiments, imaging system 100 and/or its individual associated components may be associated with a particular network link such as for example a URL (Uniform Resource Locator), an IP (Internet Protocol) address, and/or a mobile phone number.

Imaging system 100 may include various other components 180 such as speakers, displays, visual indicators (e.g., recording indicators), vibration actuators, a battery or other power supply (e.g., rechargeable or otherwise), and/or additional components as appropriate for particular implementations.

In some embodiments, system 100 may be a gas detection camera. However, other embodiments are also contemplated. For example, although various features of imaging system 100 are illustrated together in FIG. 1, any of the various illustrated components and subcomponents may be implemented in a distributed manner and used remotely from each other as appropriate. For example, various subcomponents of camera 101 may be implemented separately and from each other in some embodiments.

System 100 may be used to capture infrared images and process them to provide spatially filtered infrared images with increased gas contrast. In this regard, system 100 may be operated to perform the various processes discussed herein.

Figure 2:
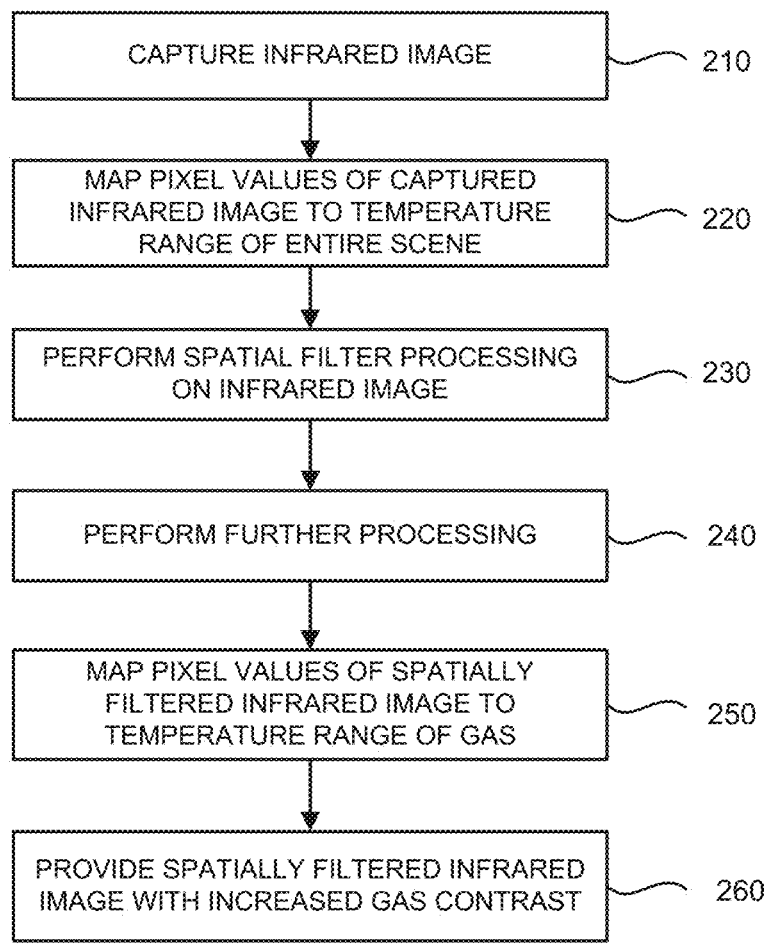
FIG. 2 illustrates a process of providing a spatially filtered infrared image with increased gas contrast in accordance with an embodiment of the disclosure.

FIG. 2 illustrates a process of providing a spatially filtered infrared image with increased gas contrast in accordance with an embodiment of the disclosure. In block 210, at least one of imagers 130 captures an infrared image of scene 170 in response to infrared radiation 173. As discussed, scene 170 includes gas 172 and other scene features 171. In block 220, logic device 110 receives the captured infrared image and maps pixel values of the captured infrared image to a temperature range including temperatures of gas 172 and other scene features 171. In this regard, gas 172 and features 171 may exhibit significantly different temperatures. Accordingly, the pixel values of the original infrared image captured in block 210 may be initially mapped to a wide range of temperatures. This large range can result in gas 172 exhibiting very limited contrast in relation to features 171 (e.g., the pixel values associated with gas 172 may be limited to a very narrow range that are not easily distinguishable from other features 171 when viewed together in a single infrared image).

In block 230, logic device 110 performs spatial filter processing on the captured infrared image frame to increase contrast of gas 172 within scene 170. In some embodiments, block 230 may be performed in accordance with one or more of the processes of FIG. 3, FIG. 4, and/or other processes as appropriate as discussed herein.

Such spatial filter processing may reduce the contributions of other features 171 in the infrared image that are outside the spatial frequencies associated with gas 172. For example, in some cases, gas 172 may be a plume that has edges that are less sharp (e.g., exhibiting lower spatial frequencies) than some portions of the captured infrared image (e.g., clearly defined objects included in scene features 171), but are also sharper (e.g., exhibiting a higher spatial frequency) than other portions of the captured infrared image (e.g., gradients or offsets exhibited by the captured infrared image or objects that are blurry or not clearly represented).

Accordingly, by applying spatial filter processing to the captured infrared image, pixel values associated with features outside the range of gas 172 may be removed (e.g., reduced and/or entirely removed) from the infrared image. The resulting spatially filtered infrared image may include a narrower range of pixel values corresponding to a narrower temperature range and therefore also exhibit increased gas contrast (e.g., the pixel values associated with gas 172 may be mapped to a larger proportion of the total temperature range represented by the spatially filtered infrared image in comparison with the original captured infrared image).

In block 240, logic device 100 may perform further processing to adjust the spatially filtered infrared image. For example, such additional processing may further increase gas contrast by adjusting pixel values associated with features outside the range of gas 172. In some embodiments, block 240 may be performed in accordance with the process of FIG. 5 and/or other processes as appropriate. For example, in some embodiments, block 240 may include performing temporal difference processing on successive infrared images and/or successive spatially filtered infrared images to update a spatially filtered infrared image to further improve gas contrast.

In some embodiments, the various spatial cutoff frequencies, kernels, and/or other values used by the spatial filter processing of block 230 and the further processing of block 240 may be predetermined (e.g., selected for a typical working distance of camera 101 in relation to scene 170) and/or selected by a user as appropriate.

In block 250, logic device 110 maps pixel values of the spatially filtered infrared image to a temperature range including temperatures of gas 172 and any remaining scene features 171. Because pixel values associated with features outside the range of gas 172 have been removed as a result of the processing of blocks 230 and/or 240, the pixel values associated with gas in the resulting spatially filtered infrared image may be mapped to a larger proportion of the total temperature range represented by the spatially filtered infrared image in comparison with the original captured infrared image. As a result, the spatially filtered infrared image may exhibit increased gas contrast in comparison with the original infrared image captured in block 210.

In block 260, logic device 110 provides the spatially filtered infrared image using the mapping performed in block 250. In various embodiments, block 260 may include storing the image in memory 120, transmitting the image over communication interface 152, displaying the image on display 140, and/or other actions as appropriate. In various embodiments, the blocks of FIG. 2 may be repeated as appropriate to provide additional spatially filtered infrared images as desired.

Figure 3:
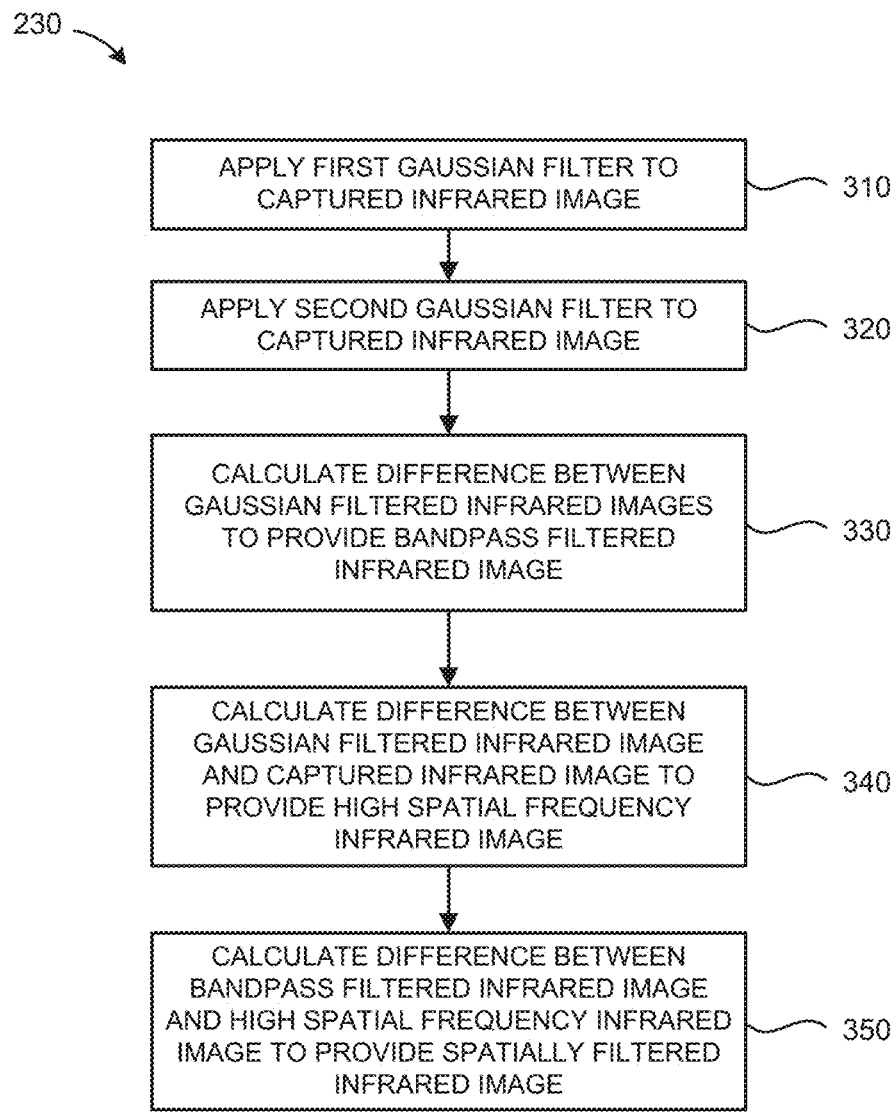
FIG. 3 illustrates a process of performing spatial filter processing on an infrared image in accordance with an embodiment of the disclosure.

FIG. 3 illustrates a process of performing spatial filter processing on an infrared image in accordance with an embodiment of the disclosure. As discussed, the process of FIG. 3 may be performed by logic device 110 in block 230 of the process of FIG. 2.

In blocks 310 and 320, logic device 110 applies different gaussian filters to the infrared image captured in block 210 of FIG. 2. For example, different gaussian convolutions may be applied to the captured infrared image using different gaussian curves to perform low pass spatial frequency filtering on the captured infrared image.

For example, a first gaussian filter (e.g., also referred to as a narrow gaussian filter) may be applied in block 310, and a second gaussian filter (e.g., also referred to as a broad gaussian filter) may be applied in block 320. The gaussian filters applied in blocks 310 and 320 may be selected in relation to the spatial frequencies associated with a typical gas of interest and other scene features. In this regard, the first gaussian filter may be selected to filter out spatial frequencies above those associated with gas 172 (e.g., a low pass spatial frequency filter with a spatial cutoff frequency selected to filter out high spatial frequency portions of features 171), and the second gaussian filter may be selected to filter out spatial frequencies associated with gas 172 and above (e.g., a low pass spatial frequency filter having a spatial cutoff frequency below that of the first gaussian filter selected to filter out gas 172 and also high spatial frequency portions of features 171). For example, the first gaussian filter may use a gaussian curve having a lower standard deviation than that of the second gaussian filter.

In block 330, logic device 110 performs a difference calculation using the first gaussian filtered infrared image provided by block 310 and the second gaussian filtered infrared image provided by block 320 (e.g., subtracting one from the other). As discussed, the first and second gaussian filters have different associated low pass filter cutoff frequencies. As a result, the first and second gaussian filtered infrared images may exhibit different spatial frequencies. In this regard, the first gaussian filter's higher cutoff frequency will cause the resulting first gaussian filtered infrared image to exhibit reduced high spatial frequencies associated with features 171, but will retain the lower spatial frequencies associated with gas 172. The second gaussian filter's lower cutoff frequency will cause the resulting second gaussian filtered infrared image to exhibit reduced spatial frequencies associated with both gas 172 and features 171.

Accordingly, by calculating a difference between the first and second gaussian filtered infrared images in block 330, a bandpass filtered infrared image may be provided that still includes the spatial frequencies associated with gas 172, but removes spatial frequencies above and below those associated with gas 172. In some embodiments, the resulting bandpass filtered infrared image may be provided as the spatially filtered infrared image to the process of FIG. 2. In some embodiments, the bandpass filtered infrared image may be further adjusted in blocks 340 and 350.

In block 340, logic device 110 performs a difference calculation using the first or the second gaussian filtered infrared image provided by block 310 or 320 and the original infrared image captured in block 210 of FIG. 2 (e.g., subtracting one from the other) to provide an edge enhanced infrared image. It will be appreciated that the original infrared image is unfiltered and therefore includes all spatial frequencies. However, the gaussian filtered infrared images will have at least some high spatial frequencies removed by the filtering performed in blocks 310 and 320. Accordingly, by taking the difference between the original infrared image and one of the gaussian filtered images, high spatial frequencies will be preserved, while low spatial frequencies will be removed. Accordingly, the resulting difference image obtained in block 340 will correspond to a high spatial frequency infrared image (e.g., an edge enhanced image).

In block 350, logic device 110 performs a difference calculation using the bandpass filtered infrared image of block 330 and the high spatial frequency image of block 340 (e.g., subtracting one from the other) to provide a spatially filtered infrared image to the process of FIG. 2. Accordingly, the spatially filtered infrared image provided in block 350 will include the bandpassed spatial frequencies of gas 172 provided by the bandpass filtered infrared image of block 330, and will exhibit a further reduction in the edges of high spatial frequency content as a result of the difference taken to remove the content of the high spatial frequency image of block 340.

Figure 4:
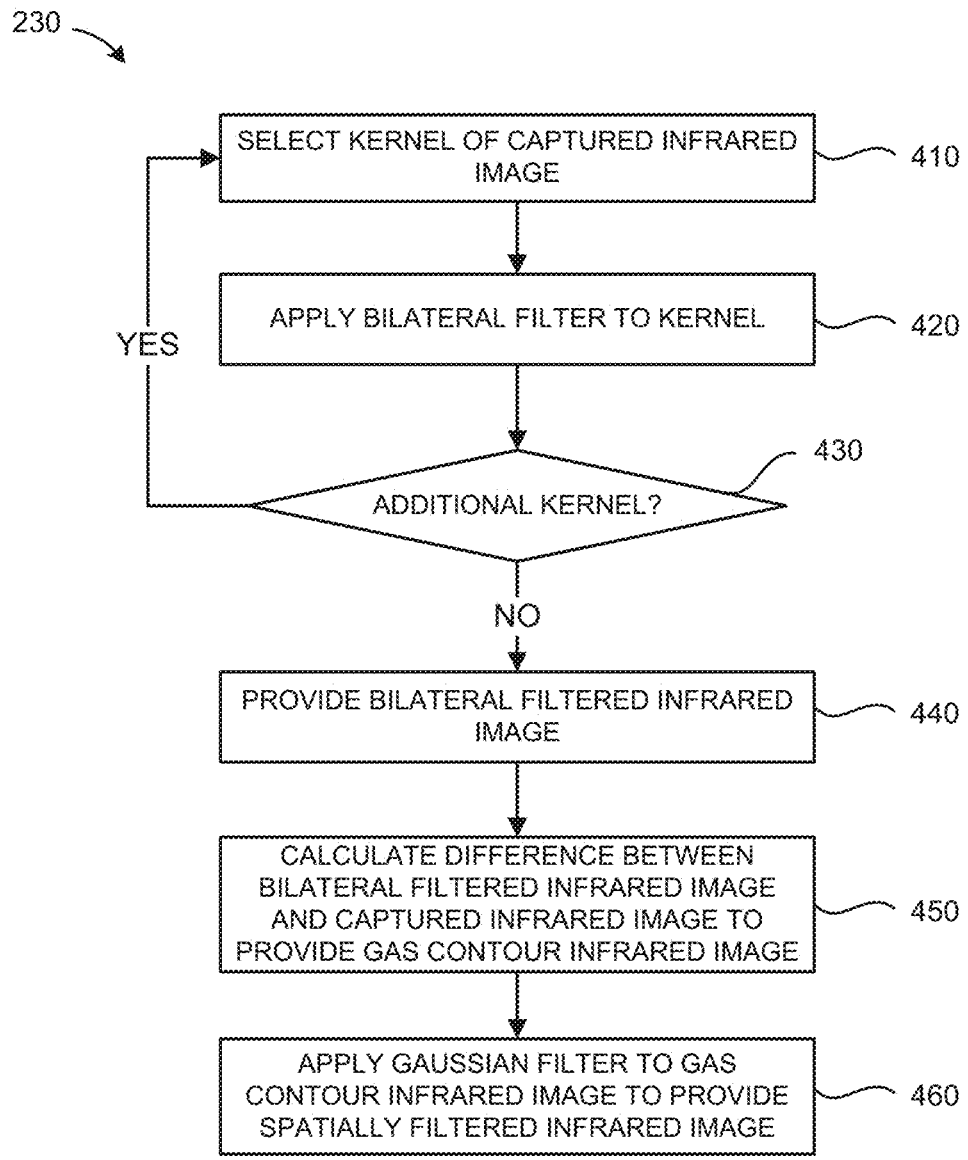
FIG. 4 illustrates another process of performing spatial filter processing on an infrared image in accordance with an embodiment of the disclosure.

FIG. 4 illustrates another process of performing spatial filter processing on an infrared image in accordance with an embodiment of the disclosure. As discussed, the process of FIG. 4 may be performed by logic device 110 in block 230 of the process of FIG. 2.

In block 410, logic device 110 selects a kernel (e.g., a set of pixel locations having a corresponding set of pixel values) of the infrared image captured in block 210 of FIG. 2. For example, in some embodiments, a 7×7 kernel may be selected corresponding to a neighborhood of 49 pixels surrounding and including a center pixel of interest. Other kernel sizes may be uses as appropriate.

In block 420, logic device 110 applies a bilateral filter to the selected kernel. In this regard, the bilateral filter may update the value of the center pixel using a weighted average of the values of the other pixel values in the neighborhood of the kernel. Significantly, the weighting used by the bilateral filter depends on both the distance of the other pixel values and their associated values. As a result, high spatial frequency features (e.g., sharp edges) may be preserved, while lower spatial frequency features may be reduced (e.g., smoothed). In various embodiments, the kernel size and weighting used by the bilateral filter may be selected to preserve sharp edges associated with spatial frequencies above those associated with gas 172.

In block 430, logic device 110 determines whether any additional kernels of the captured infrared image remain to be processed. If yes, then the process repeats blocks 410 and 420 for another kernel. Otherwise, the process continues to block 440. In block 440, logic device 110 provides a bilateral filtered infrared image that includes the updated pixel values determined in the previous iterations of block 420.

In block 450, logic device 110 performs a difference calculation using the bilateral filtered infrared image of block 440 and the captured infrared image (e.g., subtracting one from the other) to provide a gas contour infrared image. As discussed, the bilateral filtered infrared image will retain sharp edges associated with high spatial frequency content, while smoothing lower spatial frequency content. Accordingly, by calculating a difference between the bilateral filtered infrared image and the captured infrared image, sharp edges associated with high spatial frequency content may be removed while lower spatial frequency content associated with gas 172 may be preserved in the resulting gas contour infrared image. In some embodiments, the resulting gas contour infrared image may be provided as the spatially filtered infrared image to the process of FIG. 2. In some embodiments, the gas contour infrared image may be further adjusted in block 460.

In block 460, logic device 110 applies a gaussian filter to the gas contour infrared image to provide a spatially filtered infrared image to the process of FIG. 2. For example, block 460 may include applying a gaussian convolution to the gas contour infrared image to perform low pass spatial frequency filtering to further filter out spatial frequencies above those associated with gas 172 (e.g., similar or identical to the first gaussian filter discussed in block 320). In various embodiments, a larger kernel may be used for the bilateral filter to include more low spatial frequency content. Binned image processing techniques may also be used as appropriate.

Figure 5:
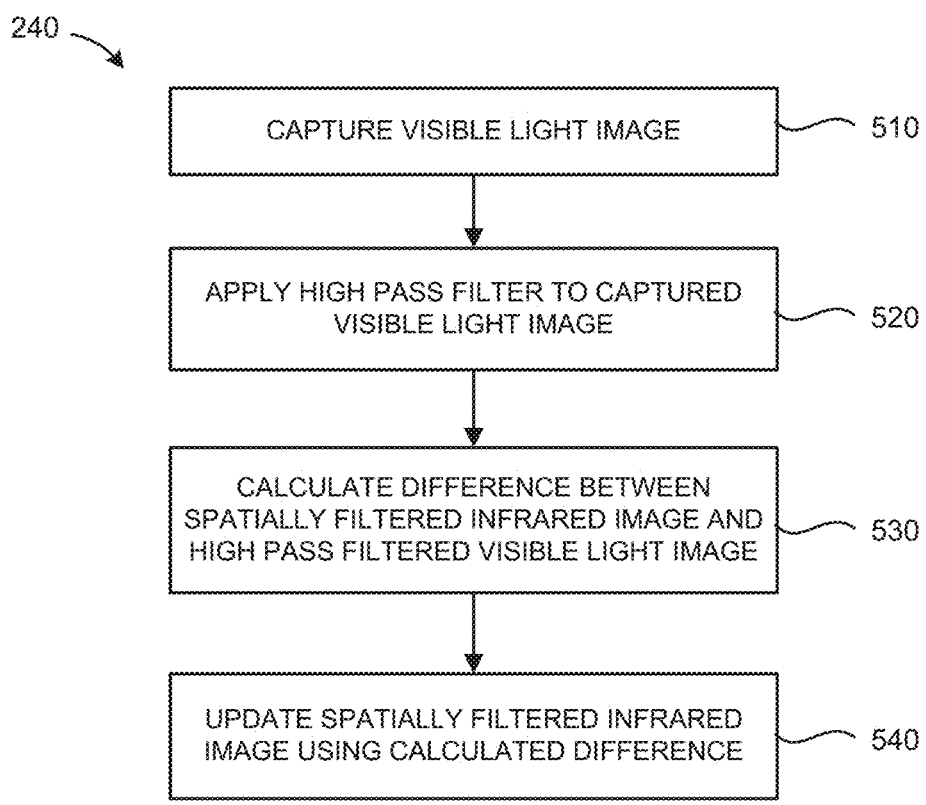
FIG. 5 illustrates a process of adjusting a spatially filtered infrared image to further increase gas contrast in accordance with an embodiment of the disclosure.

FIG. 5 illustrates a process of adjusting a spatially filtered infrared image to further increase gas contrast in accordance with an embodiment of the disclosure. As discussed, the process of FIG. 5 may be performed by logic device 110 in block 240 of the process of FIG. 2.

In block 510, at least one of imagers 130 captures a visible light image of scene 170 in response to visible light 174. In some embodiments, the visible light image may primarily include scene features 171, whereas gas 170 may not appear in the visible light image if it does not absorb or reflect visible light 170.

In block 520, logic device 110 receives the visible light image and applies a high pass spatial frequency filter to the visible light image. The resulting high pass filtered visible light image will preserve edges of scene features 171 corresponding to high spatial frequencies and will filter out other portions of scene 170 and features 171 corresponding to low spatial frequencies. In some embodiments, the high pass spatial frequency filter may apply a filter cutoff higher than the spatial frequencies associated with gas 172 such that only features 171 in the filtered visible light image having spatial frequencies above those associated with gas 172 are preserved in the resulting high pass filtered visible light image.

In block 530, logic device 110 performs a difference calculation using the spatially filtered infrared image provided in block 230 by the process of FIG. 3 or 4 and the high pass filtered visible light image provided in block 520 (e.g., subtracting one from the other). In this regard, the spatially filtered infrared image will primarily include content corresponding to spatial frequencies associated with gas 172.

On the other hand, the high pass filtered visible light image may include primarily the edges (e.g., high spatial frequency content) of scene features 171. As discussed, gas 172 may not appear in the visible light image in some cases. Accordingly, by calculating a difference between the spatially filtered infrared image and the high pass filtered visible light image, edges of non-gas features may be further removed from the spatially filtered infrared image.

In some embodiments, if other scene features 171 (e.g., non-gas objects in scene 170) exhibit similar spatial frequencies as gas 172, then at least portions of scene features 171 corresponding to infrared radiation 173 may remain in the spatially filtered infrared image. Accordingly, in some embodiments, the high pass spatial frequency filter may apply a filter cutoff lower than the spatial frequencies associated with gas 172 such that features 171 in the filtered visible light image having spatial frequencies that overlap with those associated with gas 172 may be preserved in the resulting high pass filtered visible light image. Because gas 172 may not appear in the visible light image in some cases, the portions of scene features 171 overlapping with the spatial frequencies of gas 172 may be further reduced by the difference taken in block 530.

In block 540, the spatially filtered infrared image is updated in accordance with the difference calculated in block 530 to further increase gas contrast in the spatially filtered infrared image.

In view of the present disclosure, it will be appreciated that spatial filtering and other processing may be performed on infrared images to provide improved gas contrast. For example, FIGS. 6 through 9 illustrate the improvement in gas contrast that may be realized by various techniques disclosed herein in comparison to conventional techniques. In particular, each of FIGS. 6 through 9 illustrate the resulting infrared images generated by processing the same original infrared image with different techniques.

Figures 6, 7:
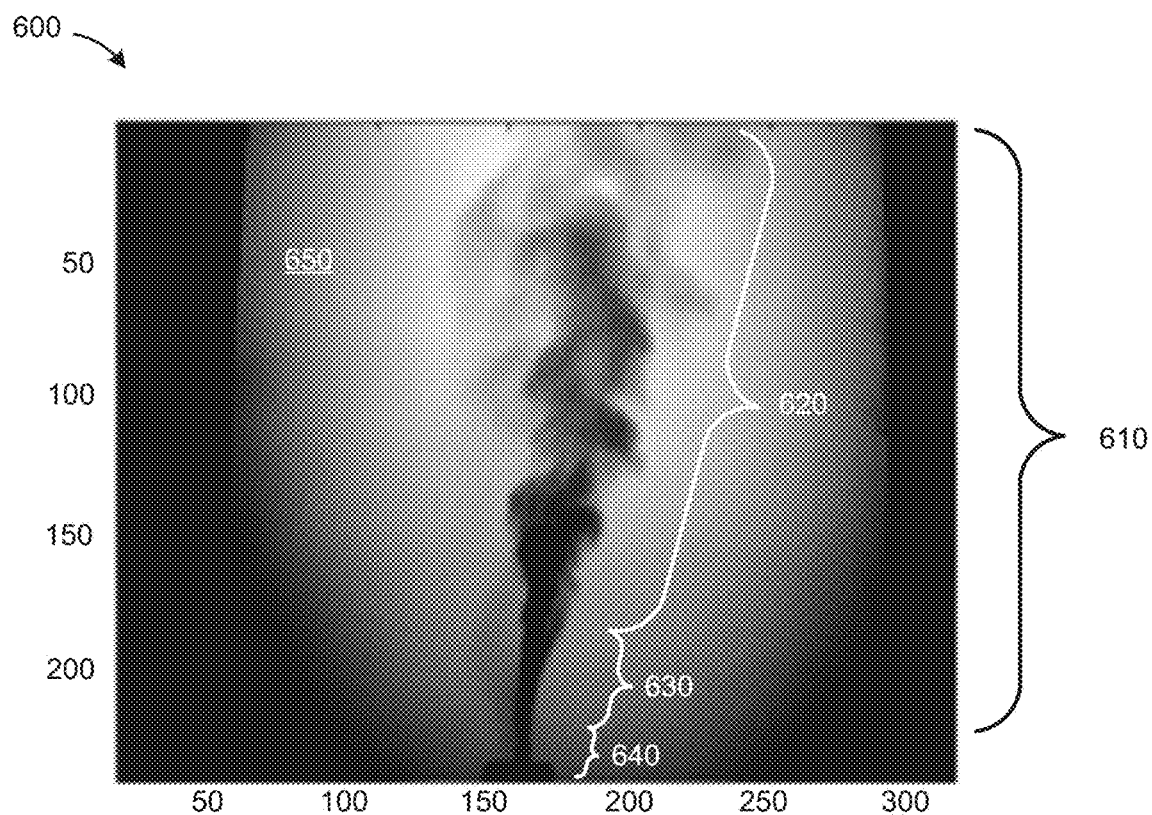
FIG. 6 illustrates an example spatially filtered infrared image generated in accordance with the process of FIG. 3 in accordance with an embodiment of the disclosure.
FIG. 7 illustrates an example spatially filtered infrared image generated in accordance with the process of FIG. 4 in accordance with an embodiment of the disclosure.

In this regard, FIG. 6 illustrates an example infrared image 600 generated in accordance with the spatial filtering process of FIG. 3, and FIG. 7 illustrates an example infrared image 700 generated in accordance with the process of FIG. 4, in accordance with embodiments of the disclosure. As shown in both FIGS. 6 and 7, a gas plume 610/710 is shown exiting a nozzle 640/740. The entirety of the gas plume 610/710 is clearly evident and is shown in clear contrast to the background 650/750 of the scene. In particular, both the dispersed upper portion 620/720 and the concentrated lower portion 630/730 of the gas plume 610/710 are clearly visible.

Figure 8:
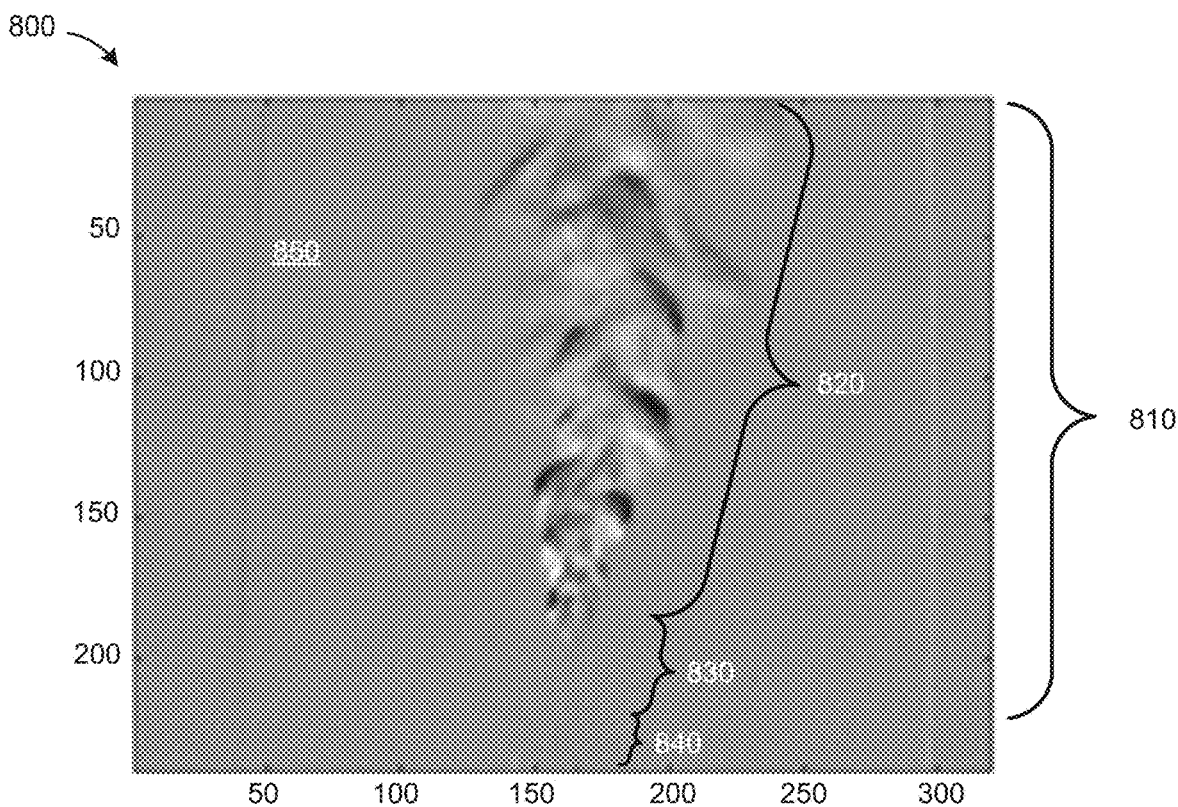
FIG. 8 illustrates an example infrared image generated in accordance with a conventional gas contrast enhancement process.

FIG. 8 illustrates an example infrared image generated in accordance with a conventional gas contrast enhancement process using histogram equalization processing. As shown in FIG. 8, a portion of a gas plume 810 appears but with only limited visibility. In particular, only the dispersed upper portion 820 is clearly visible, while the concentrated lower portion 830 and the nozzle 840 are not easily discernable.

Figure 9:
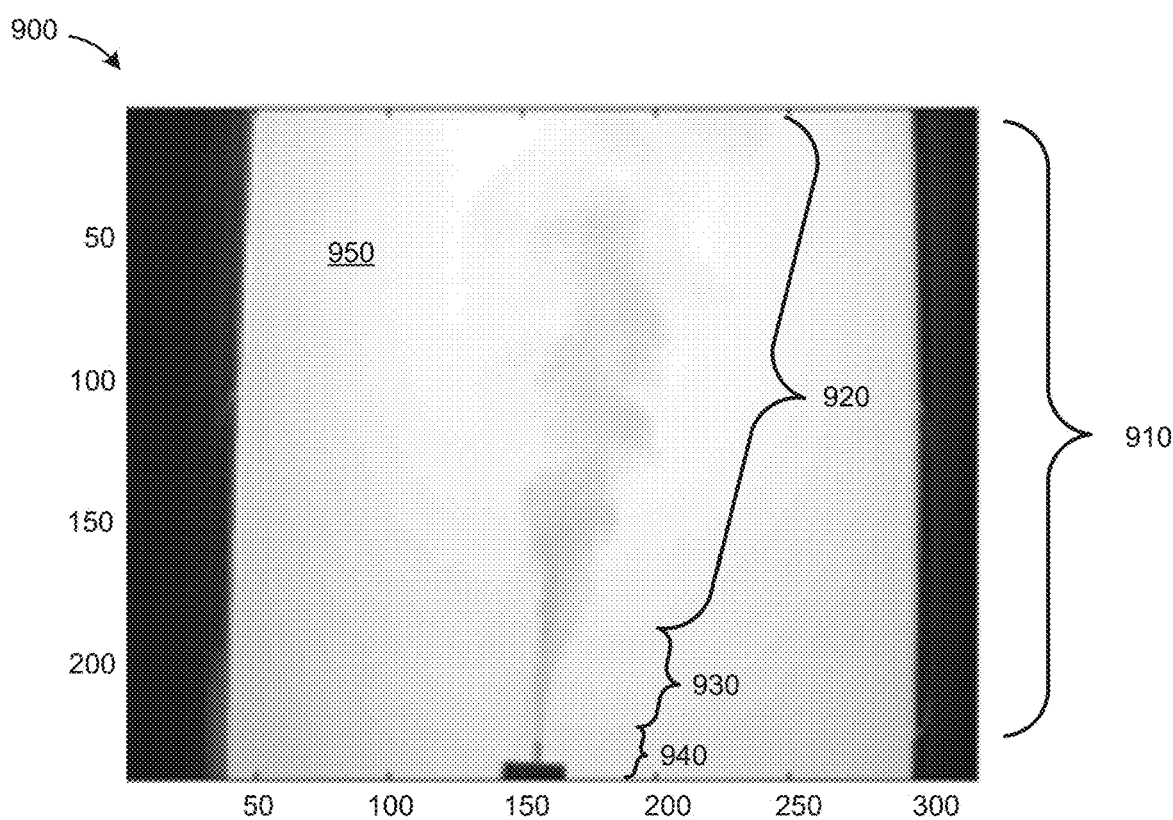
FIG. 9 illustrates an example infrared image generated in accordance with another conventional gas contrast enhancement process.

FIG. 9 illustrates an example infrared image generated in accordance with a conventional gas contrast enhancement process using manual adjustment of level and span by a user.

As shown in FIG. 9, a gas plume 910 appears but with only limited visibility. In particular, the dispersed upper portion 920 and the concentrated lower portion 930 are both not easily discernable above nozzle 940.

Thus, as illustrated by FIGS. 6 through 9, the spatial processing techniques disclosed herein may be used to provide improved gas contrast for infrared images in comparison to conventional processing techniques.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
receiving a captured infrared image comprising a gas feature and a scene feature, wherein the captured infrared image comprises a first range of pixel values associated with a first temperature range of the gas feature and the scene feature;
applying a spatial filter to the captured infrared image to provide a spatially filtered infrared image retaining the gas feature and removing the scene feature; and
wherein the spatially filtered infrared image comprises a second range of pixel values associated with a second temperature range of the gas feature without the additional scene feature to exhibit increased gas contrast over the captured infrared image.

2. The method of claim 1, wherein the applying comprises:
applying a first gaussian filter having a first spatial cutoff frequency to the captured infrared image to provide a first gaussian filtered infrared image;
applying a second gaussian filter having a second spatial cutoff frequency to the captured infrared image to provide a second gaussian filtered infrared image; and
calculating a difference between the first and second gaussian filtered infrared images to provide a bandpass filtered infrared image.

3. The method of claim 2, wherein the applying further comprises:
calculating a difference between at least one of the gaussian filtered infrared images and the captured infrared image to provide a high spatial frequency infrared image; and
calculating a difference between the bandpass filtered infrared image and the high spatial frequency infrared image to provide the spatially filtered infrared image.

4. The method of claim 1, wherein the applying comprises:
applying a bilateral filter to the captured infrared image to provide a bilateral filtered infrared image; and
calculating a difference between the bilateral filtered infrared image and the captured infrared image to provide a gas contour infrared image.

5. The method of claim 4, wherein the applying further comprises applying a gaussian filter to the gas contour infrared image to provide the spatially filtered infrared image.

6. The method of claim 1, further comprising:
receiving a captured visible light image comprising the scene feature;
applying a high pass filter to the captured visible light image to provide a high pass filtered visible light image;
calculating a difference between the spatially filtered infrared image and the high pass filtered visible light image; and
updating the spatially filtered infrared image using the calculated difference to exhibit additional gas contrast.

7. The method of claim 1, further comprising updating the spatially filtered infrared image using temporal difference processing.

8. The method of claim 1, further comprising:
mapping the second range of pixel values of the spatially filtered infrared image to the second temperature range; and
displaying the spatially filtered infrared image using the mapping.

9. The method of claim 1, wherein the first temperature range is greater than the second temperature range.

10. The method of claim 1, wherein the captured infrared image is a thermal image.

11. A system comprising:
an infrared imager configured to capture infrared images; and
a logic device configured to:
receive a captured infrared image comprising a gas feature and a scene feature, wherein the captured infrared image comprises a first range of pixel values associated with a first temperature range of the gas feature and the scene feature,
apply a spatial filter to the captured infrared image to provide a spatially filtered infrared image retaining the gas feature and removing the scene feature, and
wherein the spatially filtered infrared image comprises a second range of pixel values associated with a second temperature range of the gas feature without the additional scene feature to exhibit increased gas contrast over the captured infrared image.

12. The system of claim 11, wherein the logic device is configured to apply the spatial filter by:
applying a first gaussian filter having a first spatial cutoff frequency to the captured infrared image to provide a first gaussian filtered infrared image;
applying a second gaussian filter having a second spatial cutoff frequency to the captured infrared image to provide a second gaussian filtered infrared image; and calculating a difference between the first and second gaussian filtered infrared images to provide a bandpass filtered infrared image.

13. The system of claim 12, wherein the logic device is further configured to apply the spatial filter by:
   calculating a difference between at least one of the gaussian filtered infrared images and the captured infrared image to provide a high spatial frequency infrared image; and
   calculating a difference between the bandpass filtered infrared image and the high spatial frequency infrared image to provide the spatially filtered infrared image.

14. The system of claim 11, wherein the logic device is configured to apply the spatial filter by:
   applying a bilateral filter to the captured infrared image to provide a bilateral filtered infrared image; and
   calculating a difference between the bilateral filtered infrared image and the captured infrared image to provide a gas contour infrared image.

15. The system of claim 14, wherein the logic device is further configured to apply the spatial filter by applying a gaussian filter to the gas contour infrared image to provide the spatially filtered infrared image.

16. The system of claim 11, further comprising:
   a visible light imager configured to capture visible light images; and
   wherein the logic device is configured to:
      receive a captured visible light image comprising the scene feature,
      apply a high pass filter to the captured visible light image to provide a high pass filtered visible light image,
      calculate a difference between the spatially filtered infrared image and the high pass filtered visible light image, and
      update the spatially filtered infrared image using the calculated difference to exhibit additional gas contrast.

17. The system of claim 11, wherein the logic device is configured to update the spatially filtered infrared image using temporal difference processing.

18. The system of claim 11, wherein the logic device is configured to map the second range of pixel values of the spatially filtered infrared image to the second temperature range for display.

19. The system of claim 11, wherein the first temperature range is greater than the second temperature range.

20. The system of claim 11, wherein the captured infrared image is a thermal image.

* * * * *